UNITED STATES PATENT OFFICE.

CARL R. KRUEGER, OF SCHENECTADY, NEW YORK, ASSIGNOR TO GENERAL ELECTRIC COMPANY, A CORPORATION OF NEW YORK.

ELECTRODE.

1,173,005.  Specification of Letters Patent.  Patented Feb. 22, 1916.

No Drawing.  Application filed April 3, 1915.  Serial No. 19,064.

*To all whom it may concern:*

Be it known that I, CARL R. KRUEGER, a citizen of the United States, residing at Schenectady, in the county of Schenectady, State of New York, have invented certain new and useful Improvements in Electrodes, of which the following is a specification.

My invention has reference to improvements in luminous arc light electrodes of the magnetite type, the object being to secure a greater output of light than has hitherto been obtained for the same consumption of energy and at the same time to render the arc steady, to suppress the phenomenon known as "puddling," and to prevent the formation of an insulating cap at the tip of the electrode.

Of the luminous arc electrodes commercially used in the art the magnetite electrode is the most important. It consists of a mixture of magnetite, titanium oxid (rutile), and chromite, and to this is added a small percentage of a flux, such as sodium fluorid or potassium fluorid. This kind of electrode I have improved by substituting for the fluxes named or by using in addition to either of them a small percentage of lithium fluorid, as set forth in my application Serial No. 776,241, filed June 26, 1913. In these and other magnetite mixtures, the ingredient which mainly contributes to the production of light is the titanium in the rutile, and it has for a long time been the aim of electric light engineers to increase the light output of the arc yielded by the magnetite mixture when used as a cathode in conjunction with a non-consuming anode, usually made of copper, by increasing the amount of titanium in the electrode by an increased amount of rutile. It was found that while in this manner the luminous intensity of the arc was in fact increased, a limit was soon reached beyond which the amount of titanium oxid could not be increased without rendering the electrode as a whole commercially impracticable, because with every increase of the amount of titanium oxid the tendency of the electrode to puddle increased and the liability of the formation of an insulating cap at the tip of the electrode also increased; and in order to counteract the puddling tendency the amount of chromite also had to be increased. But the increased amount of chromite operated in its turn to reduce the consumption of the electrode and thereby reduce the light, so that the gain of light which was sought by the increased amount of rutile was not realized.

It was well recognized by electricians that rutile has a comparatively low fusing and vaporizing temperature and that chromite has a high fusing and vaporizing temperature, and that consequently rutile promoted the consumption of the electrode, while chromite restrained the consumption; also that, as a further consequence, rutile promoted puddling, while chromite tended to suppress puddling and that both tended to promote the formation of an insulating cap at the tip of the electrode. Recognizing these facts electricians heretofore aimed at such proper balance between the rutile and the chromite as would give the greatest attainable luminosity with moderate consumption of the electrode without puddling and without the formation of an insulating cap, and the practical balance was found approximately with a mixture of—

| | |
|---|---|
| Magnetite | 62% |
| Rutile | 30% |
| Chromite | 8% | and to this was added a small percentage of a flux.

In place of rutile the mineral ilmenite, which is mainly a compound of iron oxid and titanium oxid, is sometimes used, and the quantity of magnetite, pure and simple, is then correspondingly reduced; also, a mixture of rutile and ilmenite is sometimes used, but in all these variations the proportional quantities of magnetite, titanium oxid and chromite are substantially the same as above indicated. Starting from this composition any increase of the quantity of rutile had to be accompanied by an increase of the amount of chromite and the result was, therefore, not changed, except that the tendency to form an insulating cap was increased.

I have discovered that it is practicable to increase the amount of titanium in the electrode by adding it to the standard mixture and at the same time reducing the amount of chromite in such manner that the light is increased by reason of the increased amount of titanium and is further increased by the reduction of the amount of the restrainer, the chromite, without introducing the troubles of puddling and the formation of insulating caps. I have found that in order to accomplish this result the increased amount of titanium must be introduced in the form of a compound which has a higher fusing and vaporizing temperature than rutile and that this enables me to reduce the amount of chromite. In other words, the added light giving material must itself act as a restrainer, so that in addition to its light giving qualities it may also act as a substitute for a part of the chromite. I have found that titanium carbid, especially the kind which is produced in the arc furnace, is a compound which fulfils these requirements, because it contains a considerable amount of titanium, has a much higher fusing and vaporizing temperature and is a much better conductor than rutile.

My invention, therefore, broadly consists in enriching the common magnetite electrode as respects titanium by the use of a titanium compound which has a comparatively high fusing and vaporizing temperature, such as titanium carbid, and impoverishing the electrode as respects chromite. With the observance of this rule a wide range of percentages is permissible and any suitable flux may be used. By preference I use lithium fluorid, but I may use other fluxes, and, altogether, my invention is not necessarily confined to the use of any particular flux. The mixture which has given the best results is as follows:

| | |
|---|---|
| Magnetite | 57¼% |
| Rutile | 28¾% |
| Titanium carbid | 10 % |
| Chromite | 4 % |
| Total | 100% |

To the above mixture I add by preference 1% of lithium fluorid. A further increase of the titanium content in the form of titanium carbid is practicable, and this permits a further decrease in the amount of chromite, the rule being that every increment of titanium carbid permits a decrement of chromite, and I have even used with good results an electrode in which the rutile was entirely substituted by such an amount of titanium carbid as gave an increased titanium content to the electrode, and in which the chromite was entirely omitted. This electrode was composed as follows:

| | |
|---|---|
| Magnetite | 67.3% |
| Titanium carbid | 32.7% |
| Chromite | None |
| Total | 100 % | and to this 1% of lithium fluorid was added. But I have found that for a variety of practical reasons, and particularly on account of the high cost of titanium carbid, the addition to the common magnetite electrode of about 10% of titanium carbid and the reduction of the chromite to about one-half of the normal amount is to be preferred and gives excellent results.

Irrespective of the gain of light for the same energy output secured by the addition of titanium carbid and the accompanying reduction or entire elimination of chromite, as above described, the reduction or elimination of chromite by itself secures an advantage of considerable importance. Chromite is a complex body, containing in addition to definite amounts of chromium, iron and oxygen, numerous impurities which vary greatly in amount and kind, so that this material introduces an element of uncertainty and variability in the electrode, and, therefore, other things being equal, the less chromite is used the more uniform the electrode can be made.

There are two kinds of titanium carbid commercially obtainable, namely, titanium carbid made in the electric resistance furnace, which contains a large percentage of carbon, more than the theoretical amount, say about 25 or 30%; and titanium carbid made in the electric arc furnace containing only a small percentage of carbon, about 6 to 10%. In the formula which I have given for the best mixture known to me the 10% titanium carbid is meant to be arc furnace carbid. This material is preferable on account of its large percentage of titanium and on account of its higher fusing and vaporizing temperature. However, I am not confined to the use of this kind of titanium carbid, since resistance furnace carbid may also be used, in which case, however, the percentage should be preferably increased. Other compounds of titanium having high fusing and vaporizing temperatures may be used in place of titanium carbid, such, for instance, as titanium nitrid, but, on the whole, arc furnace titanium carbid I have found to be the best material. Likewise, other chromium compounds than chromite, such, for instance, as chromium oxid may be used, and the metal chromium itself is available as a restrainer.

It will be seen from the foregoing that the light giving component in my improved electrode may be either a mixture of rutile with titanium carbid, or it may be titanium carbid alone, or titanium nitrid alone, or it may be a mixture of all these three ingredients, so long as it has, in addition to its light giving property, also the property of restraining consumption and suppressing, more or less, the phenomenon of puddling and thus acts in this latter respect as a complement of the chromium compound. In another view of the case, the chromium compound may be considered the complement of the refractory titanium compounds in so far as these latter act as anti-puddling ingredients. When the light giving component is either titanium carbid alone or titanium nitrid alone, the quantity of the complementary anti-puddling chromium compound may, as hereinbefore pointed out, become reduced to zero. The condition aimed at is that there be a quantity of anti-puddling titanium compound and just enough chromium compound to prevent puddling; when used in such relative quantities the two compounds are true complements with reference to each other. But such absolute balance between the two ingredients can rarely be attained owing to inevitable impurities in the materials, and it is, therefore, advisable to use a slight excess of either the anti-puddling titanium compound or the chromium compound, but preferably the former.

What I claim as new and desire to secure by Letters Patent of the United States, is:—

1. A luminous arc light electrode containing magnetite, a light giving component comprising an anti-puddling titanium compound, and a complementary quantity of anti-puddling chromium compound.

2. A luminous arc light electrode containing magnetite, a light giving component comprising an anti-puddling titanium compound, a complementary quantity of anti-puddling chromium compound, and a flux.

3. A luminous arc light electrode containing magnetite, rutile, a restraining titanium compound, a complementary quantity of restraining chromium compound, and a flux.

4. A luminous arc light electrode containing magnetite, rutile, an anti-puddling titanium compound, a complementary quantity of anti-puddling chromium compound, and a flux.

5. A luminous arc light electrode containing magnetite, low and high refractory titanium compounds, a chromium compound, and a flux, the parts being so proportioned that every increment of high refractory titanium compound is balanced by a decrement of chromite.

6. A luminous arc light electrode containing magnetite, titanium oxid, arc furnace titanium carbid, chromite, and a flux.

7. A luminous arc light electrode mixture composed of $57\frac{1}{4}$ parts of magnetite, $28\frac{3}{4}$ parts of rutile, 10 parts of arc furnace titanium carbid, 4 parts of chromite, and 1 part of lithium fluorid.

In witness whereof, I have hereunto set my hand this 2nd day of April 1915.

CARL R. KRUEGER.